United States Patent [19]
Tolkacz et al.

[11] Patent Number: 5,720,258
[45] Date of Patent: Feb. 24, 1998

[54] INTERNAL COMBUSTION ENGINE CONTROL

[75] Inventors: Joseph Mark Tolkacz, Novi; William Joseph Bolander, Ortonville; Robert Charles Simon, Jr., Novi; Gary Arthur Nichols, Farmington Hills, all of Mich.

[73] Assignee: General Motors Corporation, Detroit, Mich.

[21] Appl. No.: 766,077

[22] Filed: Dec. 16, 1996

[51] Int. Cl.$^6$ .................................................. F02D 41/16
[52] U.S. Cl. ............................... 123/352; 123/339.15
[58] Field of Search ..................... 123/339.2, 339.15, 123/320, 327, 350, 352, 361, 396; 364/431.07

[56] References Cited

U.S. PATENT DOCUMENTS

| | | | |
|---|---|---|---|
| 5,269,271 | 12/1993 | Kawai et al. | 123/339.2 |
| 5,391,127 | 2/1995 | Nishimura | 123/350 |
| 5,479,897 | 1/1996 | Kawai et al. | 123/339.2 |
| 5,651,341 | 7/1997 | Harada et al. | 123/339.2 |

*Primary Examiner*—Thomas N. Moulis
*Attorney, Agent, or Firm*—Michael J. Bridges

[57] ABSTRACT

Control of engine speed responsive to a deviation in engine speed away from a target speed is applied selectively under closed-loop airflow control operating conditions, such as idle and coastdown operating conditions in response to analysis of a cause of an engine intake airflow deviation away from a modeled airflow. If airflow deviations are determined to have resulted from variation in internal engine friction away from a nominal friction level, the control is applied. If airflow deviations are determined to have resulted from change in internal engine airflow restriction, such as due to contaminant build-up over a period of engine use, then the control is not applied under closed-loop airflow control operating conditions to avoid overcompensating for such deviations.

13 Claims, 3 Drawing Sheets

INTERNAL COMBUSTION ENGINE CONTROL

TECHNICAL FIELD

This invention relates to automotive internal combustion engine control and, more particularly, to engine speed and intake airflow control under idle and coastdown operating conditions.

BACKGROUND OF THE INVENTION

Conventional internal combustion engine speed control under idle and coastdown operating conditions adjusts the mount of air that flows through an engine throttle body or through a bypass valve by controlling a throttle blade angle in the throttle body or controlling a bypass valve position. Such control may perform poorly when the controlled hardware is at production tolerance limits. For example, a given controlled throttle blade angle or bypass valve position may not correspond to a predictable engine intake air rate at production tolerance limits, resulting in speed error or control instability. Further, contaminants may build up in the engine over a period of use which tend to restrict airflow through the engine, changing the airflow rate through an engine for a given throttle blade angle or for a given bypass valve position. Still further, internal engine friction can vary significantly between engines that share calibration values such that significantly different intake air rates may be required between such engines to maintain a given engine speed.

To overcome such engine control difficulties, a learning function has been proposed in which a deviation away from a nominal calibration value (or a modeled value) of throttle blade position or bypass valve position required to maintain a given engine speed is learned and stored for application as an open-loop control correction. Such proposed learning function does not distinguish between deviations caused by variation in internal engine friction and deviations caused by flow restriction conditions within the engine. Flow restriction conditions may be caused by part tolerances, e.g. low flow parts, or by contaminant build-up within the engine.

It has been demonstrated that under certain engine operating conditions, engine control can be significantly improved by applying open-loop control corrections selectively depending on whether a control deviation is caused by internal engine friction or is caused by engine flow restriction. More specifically, open-loop control corrections should always be applied for deviations caused by internal engine friction variation, but should only selectively be applied during engine speed control for deviations caused by internal flow restriction conditions in the engine. Engine intake airflow is typically a measured parameter. When airflow is the control parameter in internal combustion engine control, a direct measure of engine intake air is available for closed-loop control which accounts for engine airflow restriction conditions such that additional open-loop compensation for such restrictions is not only unnecessary, but can perturb the closed-loop control and deteriorate engine control performance. Such a direct measure of internal engine friction is not available and therefore compensation for the effects of internal engine friction is required at all times for high performance engine control.

It would therefore be desirable to provide for engine speed control that distinguishes the cause of an internal combustion engine control deviation and applies open-loop control compensation selectively, depending on the determined cause of the deviation.

SUMMARY OF THE INVENTION

The present invention is a desirable engine speed control approach that identifies the cause of an internal combustion engine control deviation and selectively applies open-loop control compensation while closed-loop control operations are active, depending on the cause of a control deviation to provide for high performance engine control. Adjustment to the open-loop control compensation may be periodically learned and applied to the compensation to maintain accurate open-loop compensation over an extended operating period.

More specifically, engine intake air control valve position is determined or modeled as required to maintain various engine speeds as a function of nominal engine operating conditions, and is stored. Under engine operating conditions in which closed-loop airflow rate control is desirable, such as idle or coastdown operating conditions, an actual intake air control valve position is determined as the actual position required to maintain a desired engine speed. A deviation between a stored intake air control valve position and the actual intake air control valve position is determined and a learn factor is generated, representing the change in engine intake airflow between that represented by the stored and the actual intake air control valve position. The learn factor indicates a variation away from a modeled or nominal intake air control valve position that is required to maintain a current engine speed under idle operating conditions. Engine intake mass airflow rate is determined or modeled and is stored for a representative engine as the mass airflow rate required to maintain various engine speeds as a function of nominal engine operating conditions. Actual mass airflow rate is measured and is compared to the stored mass airflow rate for the current operating conditions and a mass airflow deviation is determined as the difference therebetween. The learn factor and the airflow deviation, when analyzed together in accord with this invention, indicate the cause of any airflow deviation away from an expected airflow to maintain a desired engine speed, and then may be applied to determine whether open-loop compensation is required for the airflow deviation under the closed-loop airflow rate control, or whether such open-loop compensation should be avoided.

In accord with a further aspect of this invention, the learn factor and the mass airflow deviation are applied to a set of rules to determine a cause of airflow deviation under idle speed control operating conditions. Generally, for a positive mass airflow deviation (actual mass airflow is greater than the modeled mass airflow) and a positive learn factor (indicating additional intake air is required to maintain a desired engine speed), the cause of the airflow deviation is likely to be an increase in internal engine friction over a modeled friction level. For little or no mass airflow deviation and a positive learn factor, the cause of the airflow deviation is likely to be an increase in restriction to airflow through the engine. Alternatively, for a negative mass airflow deviation and a negative learn factor, the cause of the airflow deviation is likely to be a decrease in internal engine friction below that of a typical engine (below a modeled level). Finally, for little or no mass airflow deviation and a negative learn factor, the cause of the airflow deviation is likely to be a decrease in restriction to airflow through the engine. All such cases are analyzed in accord with an aspect of this invention, to determine which is currently the most likely cause of the airflow deviation. If internal engine friction variation away from a modeled or nominal friction level is determined to be the most likely cause, the learn factor is applied under all engine operating conditions to correct intake air valve position. If internal engine airflow restriction variation away from a modeled or nominal restriction is determined to be the most likely cause, the learn factor is not applied when mass airflow control operations that inherently correct for such deviation are active, such as under closed-loop airflow control conditions, to avoid overcompensating and perhaps disturbing an active airflow control function. Intake airflow control is improved under all idle speed control operating conditions through an improved understanding and diagnosis of the specific cause of airflow deviations and through selective control of intake airflow in response to the diagnosis.

In accord with yet a further aspect of this invention, fuzzy logic principles are applied to the learn factor and the mass airflow deviation to accurately characterize the likely cause of any airflow deviation, to ensure the selective open-loop compensation of this invention is accurately applied.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
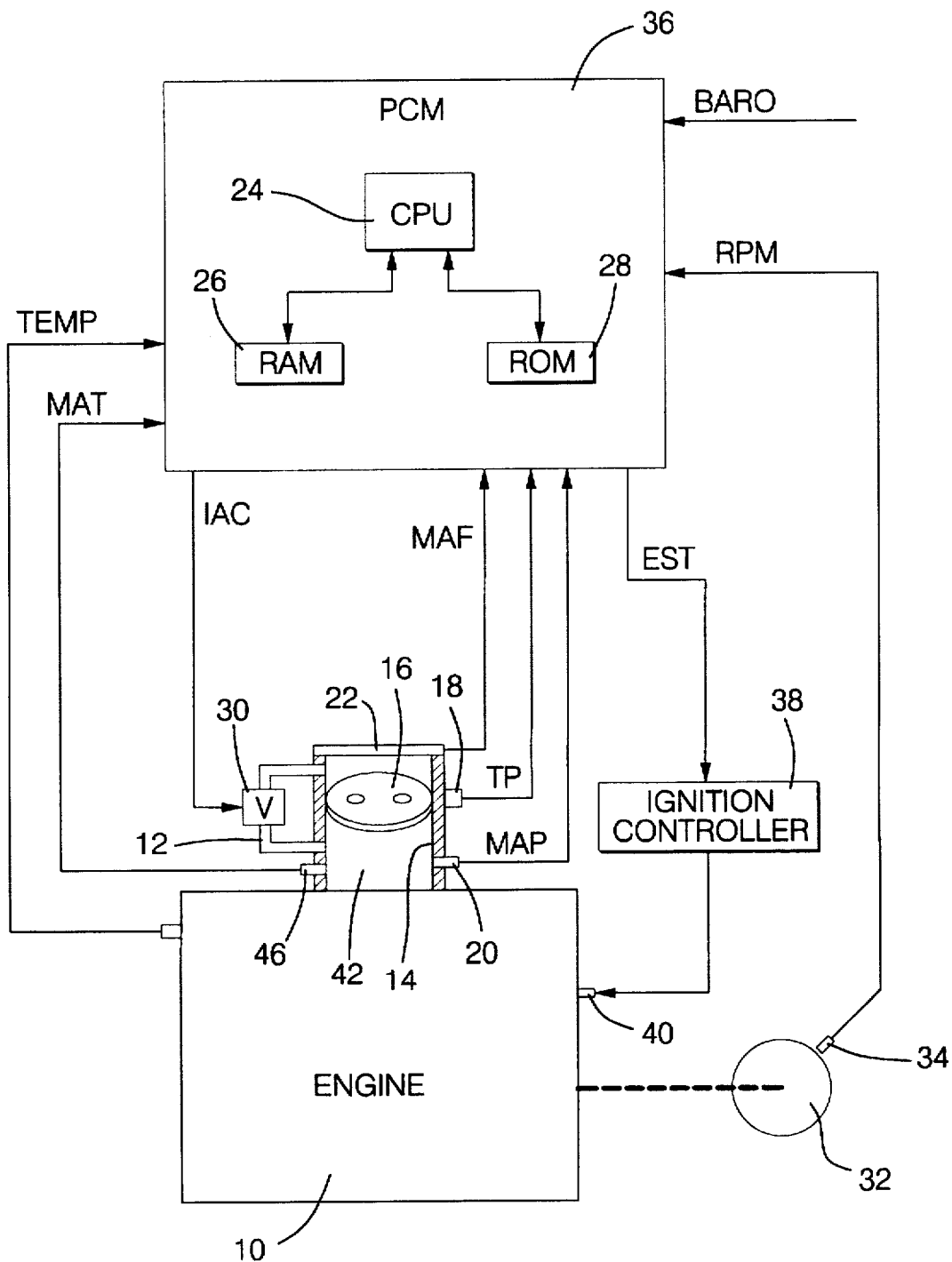
FIG. 1 is a general diagram of an internal combustion engine and engine control hardware of the preferred embodiment of this invention.

Referring to FIG. 1, internal combustion engine 10 receives intake air through intake air bore 14 past throttle valve 16 of the butterfly or rotary type into intake manifold 42 for distribution to a plurality of engine cylinders (not shown) each having at least one conventional spark plug, one representative spark plug 40 being schematically shown. The rotational position of the throttle valve 16 is manually or electronically controlled to vary restriction in the intake bore 14, the rotational position being transduced by potentiometric position sensor 18 into output signal TP. Bypass air passage 12 opens on a first end into the intake air bore 14 upstream along the normal direction of flow of intake air through bore 14 from the valve 16 and opens on a second end opposing the first end into intake bore 14 downstrream of the valve 16.

An electronically controlled bypass valve V 30 takes the form of a stepper motor controlled valve in this embodiment having a valve opening that is precisely controlled in response to control signal IAC to vary restriction to airflow through the passage 12. Alternatively, the bypass valve 30 may take the form of a conventional solenoid valve. The bypass valve 30 may, in yet a further alternative embodiment of this invention, not be required and engine intake air may be controlled at all times through electronic control of the rotational position of the intake air valve 16, wherein a rotary actuator in the form of stepper motor, DC motor, or other suitable conventional actuator may be mechanically linked to the intake air valve 16 to rotate therewith, and wherein the rotational position of the actuator is electronically controlled to provide precise control of the rotational position of the intake air valve 16, in accord with electronic valve control principles generally understood in the art.

Absolute air pressure in intake manifold 42 is transduced by conventional pressure transducer 20 into output signal MAP. Ambient barometric pressure is transduced into output signal BARO by a conventional barometric pressure sensor (not shown) or is measured by pressure sensor 20 under conditions, such as prior to engine cranking or wide open intake air valve 16 conditions characterized by a negligible pressure drop across intake air valve 16. Mass flow rate of intake air through the bore 14 is transduced by mass airflow sensor 22 of the hot wire or thick film type into output signal MAF. Intake manifold 42 air temperature is transduced into signal MAT by sensor 46 positioned in the intake manifold 42 and in the form of a conventional thermocouple or thermistor. The intake air is combined with an injected fuel quantity and admitted into engine cylinders (not shown) for combustion therein to reciprocally drive pistons (not shown) within the cylinders, the pistons being mechanically linked to an engine output shaft 32, such as a crankshaft, to rotationally drive the shaft. A plurality of spaced notches or teeth (not shown) are disposed about the shaft 32 in position to pass in proximity to a Hall effect or variable reluctance or magnetoresistive sensor 34 which is fixed in position relative to the crankshaft 32. Passage of the teeth or notches by the sensor 34 is transduced into cycles of a sensor output signal RPM, such that the frequency of the sensor output signal RPM is proportional to engine output shaft rotational rate (engine speed). In an N cylinder engine application, N/2 teeth or notches are disposed about the circumference of the output shaft 32 with an additional moth added for engine synchronization, so that substantially each tooth or notch passage indicates an engine cylinder event which, in this embodiment, is designated as an engine cylinder top dead center event in which the piston within an engine cylinder is substantially at a top dead center position to be followed by an intake piston stroke within the cylinder. A measure of engine operating temperature is provided by temperature sensor 48 which takes the form of a conventional thermocouple or thermistor located in an engine coolant circulation path for transducing the coolant temperature into output signal TEMP.

Powertrain control module PCM 36 is provided for sequencing through powertrain control and diagnostic operations including ignition timing control operations and includes such well-known elements as a central processing unit CPU 24 including arithmetic logic circuitry and control circuitry, random access memory devices RAM 26 for fast access temporary data storage and read only memory devices ROM 28 for permanent read only data storage. The PCM 36 is activated upon manual application of ignition power thereto to execute a series of instructions stored in ROM for controlling operation of the powertrain, for diagnosing powertrain fault conditions, and for communicating with external control, diagnostic and maintenance modules, in accordance with general practice in the art.

Figure 2:
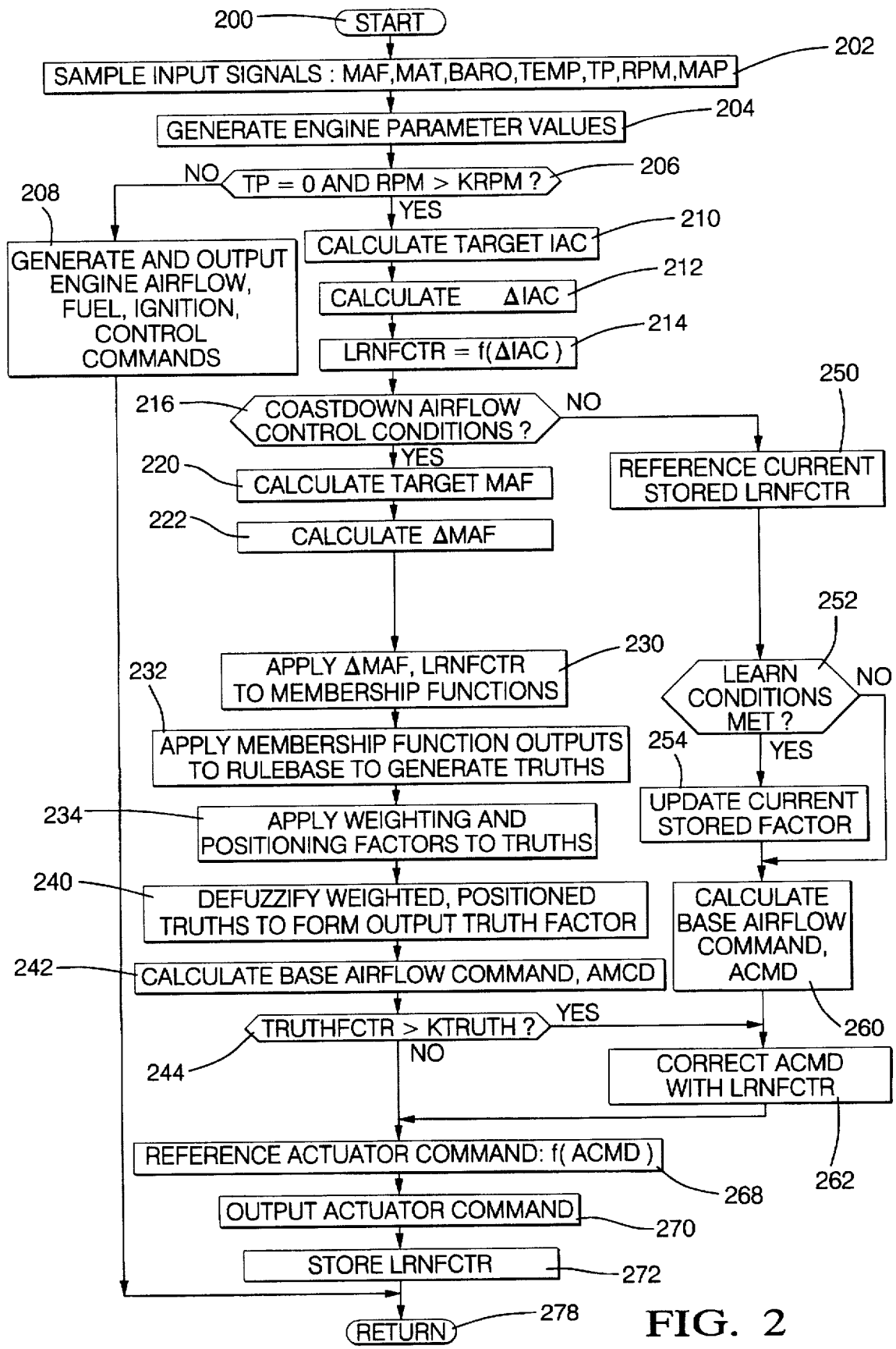
FIG. 2 is a computer flow diagram illustrating a flow of control operations of the hardware of FIG. 1 in accord with the preferred embodiment.

Included with such operations are the operations illustrated in FIG. 2 for controlling engine intake air rate under closed intake air valve 16 operating conditions, such as idle operating conditions. Control corrections required for compensating for unmodelled internal engine friction and for compensating unmodelled internal engine airflow restriction are distinguished and control compensation applied selectively to avoid unnecessary and potentially disruptive control compensation under conditions in which such compensation may be inherent in the active control procedures. The operations of FIG. 2 are periodically executed, such as about every 12.5 milliseconds while ignition power is applied to the PCM 36 of FIG. 1. Ignition power may be manually applied to the PCM by a powertrain operator, for example by positioning an ignition cylinder in an "on" position. The operations of FIG. 2 begin at a step 200 and proceed to sample input signals at a next step 202, including the described signals MAF, MAT, BARO, TEMP, TP, RPM, and MAP. Engine parameter values representing the current value of various engine parameters are next generated at a step 204 by filtering and processing the sampled input signals in any appropriate manner generally understood in the art.

Intake air valve position and engine speed are next analyzed at a step 206 to determine if conditions for controlling intake air rate using the bypass valve 30 of FIG. 1 are currently active, such as idle or coast down operating conditions characterized by a closed intake air valve 16 (FIG. 1) and an engine speed greater than a calibrated speed KRPM of about 650 r.p.m in this embodiment. If such conditions are not present, conventional engine control operations for controlling engine intake air or fuel rate and for controlling ignition timing are next carried out at a step 208 in any suitable manner known in the art. The operations of FIG. 2 are then concluded by returning, via a next step 278, to any ongoing powertrain control, diagnostic or maintenance operations that may have been temporarily suspended to allow for execution of the periodic operations of FIG. 2.

Returning to step 206, if intake air valve position, represented by filtered, conditioned signal TP indicates a closed intake air valve 16 (FIG. 1) and if engine speed represented by filtered, processed signal RPM is less than KRPM, the control operations of this embodiment are continued b by proceeding to calculate a target or desired bypass valve position, labeled IAC in this embodiment, at a next step 210. IAC is determined as a function of engine coolant temperature as indicated by signal TEMP and intake air density, which is determined as a function of ambient barometric pressure as indicated by signal BARO and of inlet air temperature as indicated by signal MAT. For example, desired engine intake air rate to provide for stable, robust control of engine speed to a desirable engine speed may be calibrated through a conventional calibration procedure as a function of varying TEMP, BARO, and MAT signals and stored in the form of a conventional lookup table in ROM 28 (FIG. 1) and individual IAC values referenced from the stored lookup table as a function of current TEMP<BARO, and MAT signals at the step 210 of FIG. 2. An IAC deviation, labeled $\Delta IAC$ is next calculated at a step 212 as a difference between the IAC determined at the described step 210 and the current position of the bypass valve 30. A learn factor LRNFCTR is next determined as a function of $\Delta IAC$ at a step 214 by convening $\Delta IAC$ to an equivalent airflow value using standard regression techniques or a physical model based on the generally understood compressible flow equation. Control conditions are next analyzed at a step 216 to determine if selective application of airflow deviation compensation is required, such as under closed-loop airflow conditions in which airflow deviation may already be compensated, to avoid unnecessary and potentially disruptive airflow deviation compensation. For example, in this embodiment, during coastdown mass airflow control operations, which may be characterized by a closed intake air valve deceleration condition in which closed-loop bypass valve 30 control operations are active, airflow deviation compensation must be selectively applied. Accordingly, if coastdown airflow control operations are active as determined at the step 216, such as may be indicated by setting a control flag in RAM 26 (FIG. 1), the steps 220–244 and 262 are executed to determine the cause of the airflow deviation using fuzzy logic procedures, and correction for the deviation is then selectively applied if the cause of the airflow variation is unmodelled variation in internal engine friction. Alternatively, if coastdown airflow control conditions are determined to not be present at the step 216, the correction may always be applied for the current engine operating condition, by carrying out the steps 250–263, by first referencing a current stored learn f actor LRNFCTR at a step 250. LRNFCTR may be stored as a single "scalar" value or may be stored in an array of cells, with each of the array dedicated to a specific engine operating region. Each region may be defined as including an engine speed and an engine load range, with all regions together covering the entire engine operating range in which the correction factors of the array are to be applied to correct for airflow deviations. A cell of the array of cells is activated (becomes the active cell) when current engine speed and load are within the range for that cell. The LRNFCTR values of the array of cells are initialized to zero at a first powertrain ignition cycle, and thereafter may be maintained in a nonvolatile portion of RAM 26 (FIG. 1) so as to retain LRNFCTR information from one ignition cycle to the next.

Returning to the step 250, a LRNFCTR from a current active cell is referenced, and learn conditions are next evaluated at a step 252. The learn conditions are conditions that must be met before the referenced LRNFCTR may be updated using any new information that has become available during the current iteration of the routine of FIG. 2. For example, the current cell must have been active for a number of iterations of the routine of FIG. 2 corresponding to about twenty-five milliseconds before any learning is allowed in that cell to ensure proper cell isolation. If the current cell has been active for at least five iterations of the routine of FIG. 2, then the learn conditions of this embodiment are met, and the referenced LRNFCTR value is updated at a next step 254 as a function of the LRNFCTR calculated at the described step 214. For example, the referenced LRNFCTR may be ramped toward the calculated LRNFCTR as follows:

$$LRNFCTRr = LRNFCTRr + K*(LRNFCTRc - LRNFCTRr)$$

in which LRNFCTRr is the learn factor referenced from the active cell at the step 250, LRNFCTRc is the learn factor calculated at the step 214, and K is a calibrated ramp rate. Alternatively, a lag filter process may be applied to update the referenced learn factor at the step 24, or any suitable function, such as a simple average function, may be applied to drive the referenced learn factor toward the learn factor calculated at the step 214. The updated learn factor is stored back into the active cell at the step 254. Next, or if the learn conditions are determined to not be met at the step 252, a base airflow command ACMD corresponding to a desired bypass valve 30 (FIG. 1) position is calculated at a next step 260, as a function of a commanded engine load, such as may be indicated by an engine operator through manual depression of an accelerator pedal (not shown), and as a function of current operating conditions including current barometric pressure as indicated by signal BARO, engine coolant temperature as indicated by signal TEMP, and current air temperature as indicated by signal MAT. ACMD may be referenced from a stored schedule of ACMD values which are determined through a conventional calibration process and stored as a function of a commanded engine load and of engine operating conditions. The referenced ACMD value is next corrected by applying the LRNFCTR of the active cell thereto at a step 262, to a command level corresponding to a bypass valve 30 (FIG. 1) position that will provide a desired engine intake air rate and compensated to account for airflow deviation caused by either unmodelled internal engine friction load or unmodelled internal engine airflow restriction. LRNFCTR may be applied to ACMD as a multiplicitive correction factor.

Returning to step 216, if coastdown airflow control conditions are present in which selective application of LRN-FCTR is required, the steps 220–244 are carried out to determine if such correction is currently to be applied. First, a target mass airflow MAF into the engine is calculated at a step 220. The target mass airflow is determined as a function of a commanded engine load from an engine operator, and as a function of barometric pressure, intake air temperature, and engine coolant temperature as indicated by signal TEMP. Mass airflow deviation ΔMAF is next calculated as a difference between current mass airflow as indicated by the filtered processed MAF signal and the calculated target MAF from the step 220. The learn factor LRNFCTR and ΔMAF values are next applied to a set of membership functions at a step 230. The set of membership functions, in accordance with fuzzy logic principles, define a normalized degree of membership of input values into a predetermined set. In this embodiment, eight membership functions are defined, as illustrated in FIGS. 3A–3H, having eight corresponding outputs M1–M8. A first membership function M1 of FIG. 3A defines a degree of membership of LRNFCTR into a magnitude function. If LRNFCTR is zero or less, M1 is set to zero. If LRNFCTR is significantly greater than zero, M1 is set to one. Otherwise, if M1 is a linear function of LRNFCTR with a substantial positive slope, as illustrated by curve 300 of FIG. 3A. A second membership function M2 of FIG. 3B defines a degree of membership of ΔMAF into a magnitude function. If ΔMAF is zero or less, M2 is set to zero. If ΔMAF is significantly greater than zero, M2 is set to one. Otherwise, if M2 is a linear function of ΔMAF with a substantial positive slope, as illustrated by curve 302 of FIG. 3B. A third membership function M3 of FIG. 3C defines a degree of membership of the difference between LRNFCTR and ΔMAF into a magnitude function. If said difference is substantially less than or substantially greater than zero, M3 is set to zero. If said difference is approximately zero, M3 is set to one. Otherwise, if said difference is between calibrated difference boundaries c1 and c2 of FIG. 3C, M3 is a piecewise linear function of said difference, for example of the general profile of curve 304 of FIG. 3C. A fourth membership function M4 of FIG. 3D defines a degree of membership of ΔMAF into a magnitude function. If ΔMAF is substantially less than or substantially greater than zero, M4 is set to zero. If ΔMAF is approximately zero, M3 is set to one. Otherwise, if ΔMAF is between calibrated boundaries d1 and d2 of FIG. 3D, M4 is a piecewise linear function of ΔMAF, for example of the general profile of curve 306 of FIG. 3D.

Figure 3A:
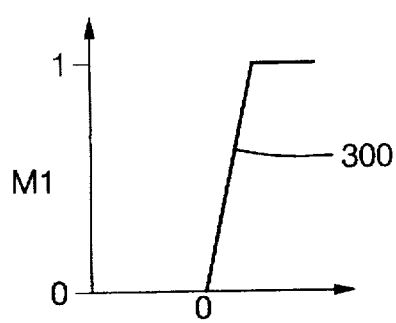
FIGS. 3A–3H are parameter diagrams illustrating control parameter weighting and normalization information used in the operations of FIG. 2.
Figure 3B:
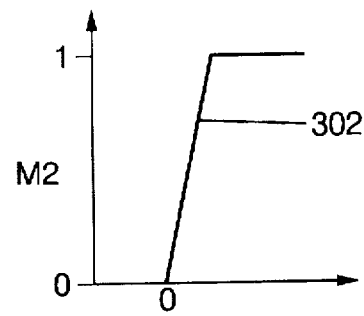
Figure 3C:
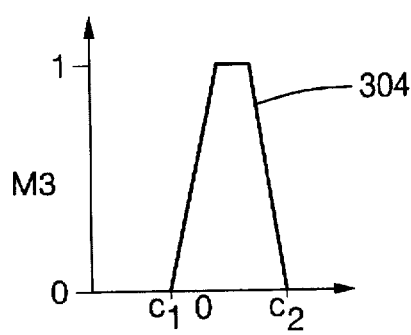
Figure 3D:
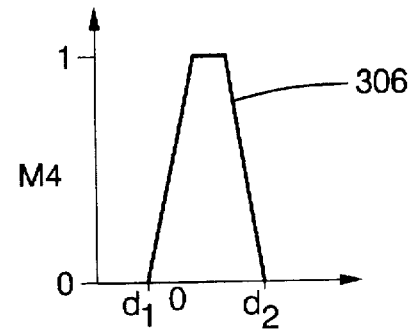
Figure 3E:
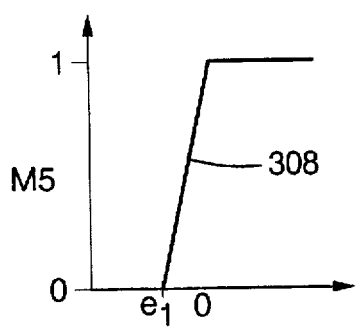
Figure 3F:
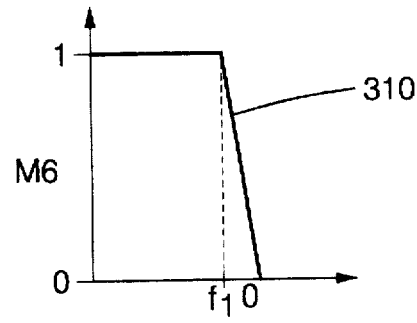
Figure 3G:
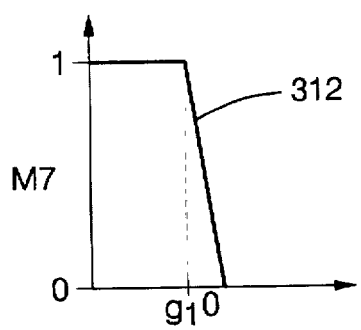
Figure 3H:
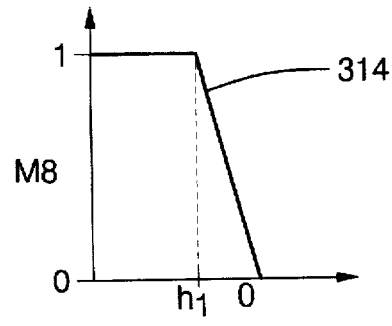

A fifth membership function M5 of FIG. 3E defines a degree of membership of the difference LRNFCTR–ΔMAF into a magnitude function. If said difference is less than a calibrated value e1, which is slightly less than zero in this embodiment as illustrated in FIG. 3E, then M5 is zero. If the difference is greater than zero, M5 is set to one. Otherwise, if the difference is between e1 and zero, M5 is a linear function of said difference with a substantial positive slope as illustrated by curve 308 of FIG. 3E. A sixth membership function M6 of FIG. 3F defines a degree of membership of LRNFCTR into a magnitude function. If LRNFCTR is substantially greater than zero, M6 is zero. If LRNFCTR is less than a calibrated value f1, which is slightly less than zero in this embodiment as illustrated in FIG. 3F, then M6 is one. Otherwise, M6 is a linear function of LRNFCTR with a substantial negative slope as illustrated by curve 310 of FIG. 3F. A seventh membership function M7 of FIG. 3G defines a degree of membership of ΔMAF into a magnitude function. If ΔMAF is substantially greater than zero, then M7 is zero. If ΔMAF is less than a calibrated value g1, which is slightly less than zero in this embodiment as illustrated in FIG. 3G, then M7 is one. Otherwise, if the difference is greater than g1 but not substantially greater than zero, M7 is a linear function of ΔMAF with a large negative slope as illustrated by curve 312 of FIG. 3G. Finally, an eighth membership function M8 of FIG. 3H defines a degree of membership of the difference LRNFCTR–ΔMAF into a magnitude function. If said difference is less than a calibrated value h1, which is less than zero in this embodiment as illustrated in FIG. 3H, then M8 is one. If the difference is substantially greater than zero, M8 is set to zero. Otherwise, if the difference is greater than h1 and is not substantially greater than zero, then M8 is a linear function of said difference with a substantial negative slope as illustrated by curve 314 of FIG. 3H.

The specific values of the membership functions are defined through a calibration procedure in which functions that characterize informational parameter relationships for determining a causes of airflow variation in accord with this invention are identified, and normalized membership functions assigned to each such relationship so that a convenient representation of the current value of such relationships may be provided to allow for further analysis in accordance with fuzzy logic analysis principles. Returning to FIG. 2, after applying the current ΔMAF and LRNFCTR values to t he eight membership functions of this embodiment, the resulting values assigned to the eight membership function outputs M1–M8, are applied to a rulebase to generate a series of truths T1–T4 as follows:

T1=M1 and M2 and M3

T2=M1 and M4 and M5

T3=M3 and M6 and M7

T4=M4 and M6 and M8 in which the "and" represents a logical "AND" operation. The first truth T1 represents the degree of truth of whether a first operating condition is present. The first operating condition is a high internal engine friction condition compensated by a significantly increased learn factor. The second truth T2 represents the degree of truth of whether a second operating condition is present. The second operating condition is a high air restriction condition compensated by a significantly increased learn factor to allow for increased engine intake air. The third truth T3 represents the degree of truth of whether a third operating conditions is present. The third operating condition is a low internal engine friction condition compensated by a negative learn factor to decrease engine intake air below a nominal intake air rate. The fourth truth T4 represents the degree of truth of whether a fourth operating conditions is present. The fourth operating condition is a low intake air restriction condition compensated by a negative learn factor for decreasing intake-air rate below a nominal intake air rate.

The degree that the current engine operating conditions is truly characterized by any of the four truths is, as described, determined by a logical "AND" of the membership functions for that truth, which may be carried out simply by assigning the truth the value of the smallest of its constituent membership functions. The truths are next, at a step 234 positioned according to a predetermined output function, wherein an output of zero indicates the airflow deviation is caused by unmodelled internal engine airflow restriction and an output of one indicates the airflow deviation is caused by unmodelled internal engine friction. Accordingly, truths T1 and T3 have a position coefficient P1 and P3, respectively, of one and truths T2 and T4 have a position coefficient P2 and P4, respectively, of zero. The truths are also given weights at the step 234 indicating a degree of confidence that each truth indicates the cause of the airflow deviation. In this embodiment, all truths are characterized substantially by an equal confidence and therefore each has a weight coefficient, W1–W4, respectively for truths T1–T4, of one. The manner in which the position and weight values are applied to the truths may be as multiplicitive factors or coefficients. The weighted, positioned truths are next "defuzzified" at a step 240, which means they are converted into a single value TRUTHFCTR indicating the degree by which the current airflow deviation is due to unmodelled restriction to airflow in the engine (indicated by a low output value—near zero) or is due to unmodelled internal engine friction conditions (indicated by a high output value—near one). The defuzzification may be summarized as follows:

$$TRUTHFCTR = \frac{T1*W1*P1 + T2*W2*P2 + T3*W3*P3 + T4*W4*P4}{T1*W1 + T2*W2 + T3*W3 + T4*W4}$$

Returning to FIG. 2, a base airflow command ACMD is next determined at a step 242 in the manner described at the step 260. The magnitude of the TRUTHFCTR is next compared to a calibrated threshold value KTRUTH which is determined as about 0.5 (plus a small offset of about 0.05 to account for indeterminate output values) as the largest value of TRUTHFCTR that indicates that any current airflow deviation is likely to substantially be due to an engine airflow restriction variation away from a nominal airflow for a typical engine. In other words, any TRUTHFCTR value above KTRUTH indicates that internal engine friction was the predominant cause of any such airflow deviation, and therefore such deviation is appropriately compensated through application of LRNFCTR to ACMD at the described step 262. Accordingly, if TRUTHFCTR exceeds KTRUTH at the step 244, the current coat down airflow control deviation is not going to be adequately compensated through closed loop airflow control responsive to signal MAF, and application of LRNFCTR to ACMD is therefore required, by proceeding from the step 244 to the described step 262. Next, or if TRUTHFCTR is not greater than KTRUTH at the step 244, an actuator command for the bypass valve 30 of FIG. 1 is referenced as the command required to drive the bypass value to a position providing for an intake air rate to the engine consistent with the value of ACMD. A schedule of command values may be determined through a measurement process during calibration procedures and stored in ROM 28 of FIG. 1 as a function of ACMD values, and a current command referenced from the stored schedule as the command corresponding to the current value of ACMD. After referencing the actuator command at step 268, the command is output at a step 270 in the form of a drive signal to the bypass valve 30 of FIG. 1 to drive the valve to an opening position to provide the desired engine intake air rate. The current LRNFCTR is next stored in a non-volatile section of RAM 26 (FIG. 1), such as back in a current active cell, for subsequent use for engine intake air rate control in accord with this invention. The routine is next concluded by proceeding to the described step 278 to return to any prior operations of the PCM 36 of FIG. 1 that may have been suspended to allow for execution of the operations of FIG. 2.

The preferred embodiment is not intended to limit or restrict the invention since many modifications may be made through the exercise of ordinary skill in the art without departing from the scope of the invention.

The embodiments of the invention in which a property or privilege is claimed are described as follows:

1. An engine speed control method for controlling engine speed to a target engine speed, comprising the steps of:

identifying engine operating conditions under which closed-loop engine intake mass airflow rate control is desired;

sampling input signals indicating a current engine operating condition;

storing a correction factor representing an engine intake airflow rate correction to maintain the target engine speed under the current engine operating condition;

sampling an input signal indicating current engine intake airflow rate; and when the current engine operating condition is an engine operating condition under which closed-loop mass airflow rate control is desired, then (a) determining a deviation of the current engine intake airflow rate away from an expected engine intake airflow rate, (b) establishing a cause of the determined deviation, and (c) selectively applying, depending on the established cause of the determined deviation, the stored correction factor to correct engine intake airflow rate.

2. The method of claim 1, further comprising the step of:

modeling the expected engine intake airflow rate as a function of the target engine speed and of the current engine operating condition;

and wherein the step of determining an engine intake airflow rate deviation determines the deviation as a difference between the modeled expected engine intake airflow rate and the current engine intake airflow rate.

3. The method of claim 2, wherein the establishing step further comprises the steps of:

detecting a change in internal engine friction away from a modeled nominal level of internal engine friction;

detecting a change in internal engine airflow restriction away from a modeled nominal level of internal engine airflow restriction;

attributing the engine intake airflow rate deviation to at least one of the detected change in internal engine friction and the detected change in internal engine airflow restriction.

4. The method of claim 3, wherein the step of selectively applying the stored correction factor applies the stored correction factor when the engine intake airflow rate deviation is attributed to the detected change in internal engine friction.

5. The method of claim 1, the engine having an intake air control valve which is positioned in response to a control command to vary restriction to engine intake air, the method further comprising the steps of:

modeling an intake air control valve position as the intake air control valve position required to maintain the target engine speed under the current engine operating condition;

determining a current intake air control valve position;

calculating a position deviation representing a difference between the modeled intake air control valve position and the current intake air control valve position;

generating a correction factor adjustment as a function of the calculated position deviation; and applying the correction factor adjustment to the stored correction factor to update the stored correction factor.

6. The method of claim 1, the engine applied in an automotive vehicle and having an intake air valve for controlling restriction to engine intake air, wherein the engine operating condition under which closed-loop mass airflow rate control is desired is a condition characterized by a closed intake air valve and a vehicle speed greater than zero.

7. A method for controlling internal combustion engine speed, comprising the steps of:

providing a schedule of open-loop correction factors for correcting engine intake airflow rate as a function of engine operating conditions;

establishing a range of engine operating conditions under which closed-loop engine intake airflow rate control is desired;

determining a current engine operating condition;

selecting an active open-loop correction factor from the provided schedule as the correction factor of the provided schedule corresponding to the current engine operating condition;

when the determined current engine operating condition is within the established range of engine operating condition, selectively applying the active open-loop correction factor, by (a) detecting a variation in engine intake airflow rate away from an expected airflow rate for the current engine operating condition, (b) diagnosing a cause of the detected variation, and (c) applying the active open-loop correction factor to correct engine intake airflow rate when the diagnosed cause is a first predetermined cause and not applying the active open-loop correction factor to correct engine intake airflow rate when the diagnosed cause is a second predetermined cause.

8. The method of claim 7, wherein engine speed is controlled to a target speed, and wherein the detecting step further comprises the steps of:

sampling at least one input signal indicating current engine intake airflow rate;

modeling an expected intake airflow rate to maintain engine speed at the target engine speed under the current engine operating condition; and detecting the variation as a difference between the current engine intake airflow rate and the expected engine intake airflow rate.

9. The method of claim 7, wherein the diagnosing step further comprises the steps of:

establishing a nominal internal engine friction value;

estimating current internal engine friction;

determining when the current internal engine friction is substantially greater than the nominal internal engine friction value;

diagnosing the cause of the detected deviation to be an increase in internal engine friction when the current internal engine friction is determined to be substantially greater than the nominal internal engine friction;

and wherein internal engine friction is the first predetermined cause.

10. The method of claim 7, wherein the diagnosing step further comprises the steps of:

establishing a nominal level of internal engine airflow restriction;

estimating a current level of internal engine airflow restriction;

determining when the current level is substantially greater than the nominal level of internal engine airflow restriction;

diagnosing the cause of the detected deviation to be an increase in internal engine airflow restriction when the current level is determined to be substantially greater than the nominal level;

and wherein internal engine airflow restriction is the second predetermined cause.

11. The method of claim 7, wherein the applying step further comprises the steps of:

determining a base engine intake airflow command;

modifying the base engine intake airflow command by applying the active open-loop correction factor thereto; and controlling engine intake airflow rate in accordance with the modified base engine intake airflow command.

12. The method of claim 7, wherein the engine is provided for driving an automotive vehicle and includes an intake air valve which is controlled to vary restriction to engine intake air, and wherein the established range of operating conditions includes a coastdown operating condition characterized by an intake air valve in a full restriction position and a vehicle speed greater than zero.

13. The method of claim 7, the engine having an intake air control valve which is positioned in response to a control command to vary restriction to engine intake air and the engine speed is controlled to a target engine speed, the method further comprising the steps of:

modeling an intake air control valve position that is required to maintain the target engine speed under the current engine operating condition;

sampling an input signal indicating current intake air control valve position;

calculating a position deviation representing a difference between the modeled intake air control valve position and the current intake air control valve position;

generating a correction factor adjustment as a function of the calculated position deviation; and applying the correction factor adjustment to the active open-loop correction factor to update the active open-loop correction factor.

* * * * *